(12) United States Patent
Yuan et al.

(10) Patent No.: US 10,127,727 B1
(45) Date of Patent: Nov. 13, 2018

(54) SYSTEMS AND METHODS TO PROVIDE AN INTERACTIVE ENVIRONMENT OVER AN EXPANDED FIELD-OF-VIEW

(71) Applicant: META COMPANY, San Mateo, CA (US)

(72) Inventors: Sheng Yuan, San Jose, CA (US); Ashish Ahuja, Mountain View, CA (US); Jie Xiang, Mountain View, CA (US); Raymond Chun Hing Lo, Richmond Hill, CA (US)

(73) Assignee: Meta Company, San Mateo, CA (US)

( * ) Notice: Subject to any disclaimer, the term of this patent is extended or adjusted under 35 U.S.C. 154(b) by 0 days.

(21) Appl. No.: 15/403,126

(22) Filed: Jan. 10, 2017

(51) Int. Cl.
| | |
|---|---|
| *G06T 11/60* | (2006.01) |
| *G06T 19/20* | (2011.01) |
| *G06T 19/00* | (2011.01) |
| *G06F 3/01* | (2006.01) |
| *G02B 27/01* | (2006.01) |

(52) U.S. Cl.
CPC ........ *G06T 19/006* (2013.01); *G02B 27/0172* (2013.01); *G06F 3/013* (2013.01); *G02B 2027/014* (2013.01); *G02B 2027/0123* (2013.01)

(58) Field of Classification Search
None
See application file for complete search history.

(56) References Cited

U.S. PATENT DOCUMENTS

| | | | | |
|---|---|---|---|---|
| 9,541,757 B2* | 1/2017 | Yokoyama | ......... | G02B 27/0081 |
| 2002/0181115 A1* | 12/2002 | Massof | ................ | G02B 27/017 |
| | | | | 359/630 |
| 2007/0188837 A1* | 8/2007 | Shimizu | ................. | G02B 5/203 |
| | | | | 359/13 |
| 2009/0128922 A1 | 5/2009 | Justis | | |
| 2011/0075257 A1* | 3/2011 | Hua | ..................... | G02B 27/017 |
| | | | | 359/464 |

(Continued)

FOREIGN PATENT DOCUMENTS

DE 102014013320 3/2016

OTHER PUBLICATIONS

Final Office Action, U.S. Appl. No. 14/852,573, dated Nov. 28, 2017 (10 pages).

(Continued)

*Primary Examiner* — Martin Mushambo
(74) *Attorney, Agent, or Firm* — Sheppard Mullin Richter & Hampton LLP

(57) ABSTRACT

Systems and methods to provide an interactive environment over an expanded field-of-view are presented herein. The system may include one or more of a headset, a first image forming component held by the headset, a second image forming component held by the headset, one or more physical processors, and/or other components. The first image forming component may be configured to generate light rays to form a first set of images of virtual content at a first resolution. The first set of images of virtual content may be presented to the user over a first angular portion of the user's field-of-view. The second image forming component may be configured to generate light rays to form a second set of images of virtual content at a second resolution. The second set of images of virtual content may be presented to the user over a second angular portion of the user's field-of-view.

27 Claims, 9 Drawing Sheets

(56) References Cited

U.S. PATENT DOCUMENTS

| | | | | |
|---|---|---|---|---|
| 2012/0033853 A1* | 2/2012 | Kaneda | ............... | G06K 9/00221 382/103 |
| 2012/0056896 A1* | 3/2012 | Border | ................. | G09G 5/02 345/592 |
| 2014/0043227 A1* | 2/2014 | Skogo | ................. | G06F 3/013 345/156 |
| 2014/0204438 A1* | 7/2014 | Yamada | ............... | G02B 27/0172 359/32 |
| 2015/0049120 A1* | 2/2015 | He | ................... | G02B 27/01 345/660 |
| 2015/0332506 A1* | 11/2015 | Aratani | ................. | G06T 19/00 345/633 |
| 2016/0026253 A1* | 1/2016 | Bradski | ............... | G02B 27/225 345/8 |
| 2016/0077336 A1 | 3/2016 | Hainich | | |
| 2016/0116745 A1 | 4/2016 | Osterhout | | |
| 2016/0131903 A1* | 5/2016 | Kollin | ................. | G02B 27/0101 349/11 |
| 2016/0187661 A1* | 6/2016 | Yajima | ................. | G02B 27/0172 345/8 |
| 2016/0370855 A1* | 12/2016 | Lanier | .................. | H04N 5/335 |
| 2017/0109562 A1* | 4/2017 | Shroff | ................. | G02B 26/0875 |
| 2017/0184848 A1 | 6/2017 | Vallius | | |
| 2017/0235143 A1* | 8/2017 | Chi | ..................... | G02B 27/141 359/204.2 |
| 2017/0315367 A1* | 11/2017 | Maruyama | ........ | G02B 27/0179 |

OTHER PUBLICATIONS

Notice of Appeal From the Examiner to the Board of Patent Appeals and Interferences, U.S. Appl. No. 14/852,573, dated Jan. 30, 2018 (2 pages).

Draft Appeal Brief Under 37 CFR 41.31(a)(1), U.S. Appl. No. 14/852,.573, dated Jan. 30, 2018 (27 pages).

* cited by examiner

SYSTEMS AND METHODS TO PROVIDE AN INTERACTIVE ENVIRONMENT OVER AN EXPANDED FIELD-OF-VIEW

FIELD OF THE INVENTION

The system and methods described herein relate to providing an interactive environment, such as an augmented reality environment and/or a virtual reality environment, over an expanded field-of-view.

BACKGROUND OF THE INVENTION

There are many types of vision systems that provide virtual or augmented reality (AR) displays. In particular, wearable technology such as head mounted displays (HMD) are becoming more popular. Currently, some AR displays have a limited field-of-view, resulting in a non-immersive interactive experience.

SUMMARY

One or more implementations of a system described herein facilitate providing an interactive environment over an expanded field-of-view. An interactive environment may include one or both of a virtual reality environment and/or an augmented reality environment. An augmented reality environment may include views of images of virtual content superimposed over views of a real-world environment. A virtual reality environment may include views of images of virtual content within a virtual environment. Views of virtual content may be presented to a user in one or both of the user's central field-of-view and/or peripheral field-of-view. The central field-of-view may refer to an angular range of a user's field-of-view when the user is looking forward. The central field-of-view may include one or more of central vision, paracentral vision, near-peripheral vision, and/or other areas and/or ranges within a user's field-of-view. The peripheral field-of-view may refer to an angular range of a user's field-of-view when the user is looking forward. The peripheral field-of-view may include one or more of near-peripheral vision, mid-peripheral vision, far peripheral vision, and/or other areas and/or ranges within a user's field-of-view. It is noted that "field-of-view" may refer generally to a horizontal field-of-view in one or both of monocular or binocular vision. It is further noted that the term "horizontal" may refer to a reference line or plane that may be orthogonal to a user's head position, and not necessarily orthogonal to the local gravity vector.

The system may include one or more of a headset, one or more physical processors, one or more image forming components, and/or other components. The one or more physical processors, one or more image forming components, and/or other components may be included in the headset. In some implementations, one or more components of the system may be included in one or more external devices, such as a desktop or laptop computer. The headset may be tethered and/or otherwise connected to the one or more external devices. Such connection may be wired (e.g., USB and/or other wired connection) and/or wireless (e.g., Bluetooth, Wi-Fi, and/or other wireless connection). The headset may be configured to be installed (e.g., worn) on a head of a user. By way of non-limiting illustration, headset may include one or more of a head-mounted display (HMD), glasses, and/or other devices.

A first image forming component may be held by the headset. The first image forming component may be configured to generate light rays to form a first set of images of virtual content at a first resolution. The first image forming component may be configured such that when the headset is installed on the head of the user, the first set of images of virtual content may be presented to a first eye of the user over a first angular portion of the user's field-of-view from the first eye (e.g., a monocular field-of-view of the first eye when looking forward). The first image forming component may be configured such that the first set of images of virtual content may be superimposed over a view of the real world to create at least part of an augmented reality environment. In some implementations, the first angular portion may correspond to the user's central field-of-view from the first eye when looking forward.

A second image forming component may be held by the headset. The second image forming component may be configured to generate light rays to form a second set of images of virtual content at a second resolution. In some implementations, the second resolution may be different from the first resolution. In some implementations, the second resolution may be same as the first resolution. The second image forming component may be configured such that when the headset is installed on the head of the user, the second set of images of virtual content may be presented to the first eye of the user over a second angular portion of the user's field-of-view from the first eye. The second angular portion may be different from the first angular portion. For example, the second angular portion may correspond to the user's peripheral field-of-view from the first eye when the first eye is looking forward. The second image forming component may be configured such that the second set of images of virtual content may be superimposed over the view of the real world to create at least a second part of the augmented reality environment.

Human vision within the peripheral field-of-view may be significantly worse than in the central field-of-view. Since visual acuity may be lost in the peripheral field-of-view, in some implementations, it may not be necessary to provide as a high-resolution of an image in that region than in the central field-of-view. Accordingly, in such implementations, the first resolution may be higher than the second resolution.

In some implementations, a user may shift their gaze such the user may not be looking straight forward (e.g., look to the left or right). The user's gaze may then be directed at portions of the field-of-view that would otherwise be within their peripheral field-of-view if the user was still looking straight forward. In such implementations, the second resolution may be the same or similar as the first resolution.

It is noted that the descriptions of the first image forming component and the second image forming component may refer to presentation of images to one eye. One or more other image forming components may be used for presenting images to the user's other eye. The one or more other image forming components may be in a mirrored configuration with respect to the first and/or the second image forming components. The central field-of-view for both eyes may be overlapped to form 3D stereoscopic vision.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
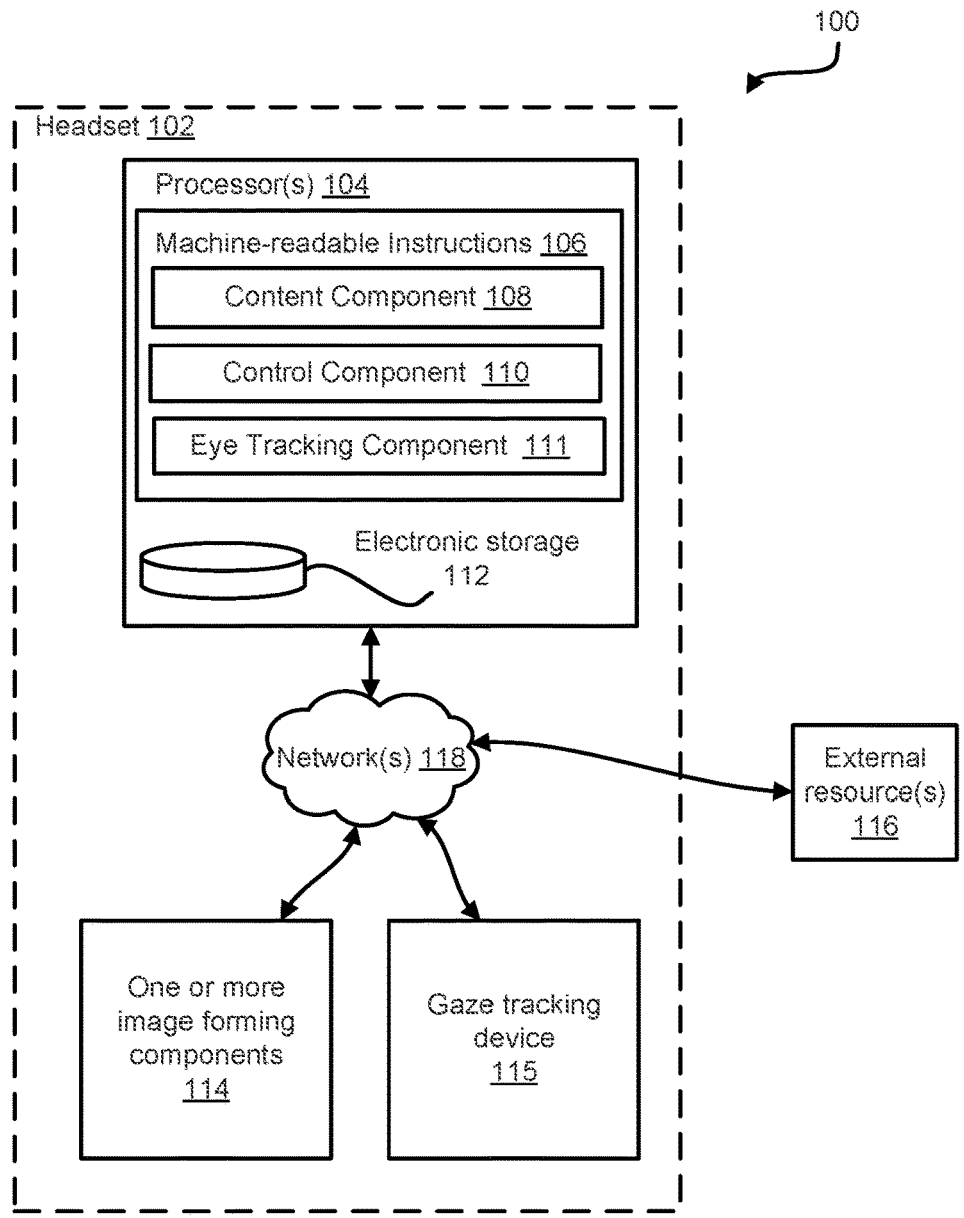
FIG. 1 illustrates a system configured to provide an interactive environment over an expanded field-of-view, in accordance with one or more implementations.

FIG. 1 shows a system 100 configured to provide an interactive environment over an expanded field-of-view. An interactive environment may include one or both of an augmented reality environment and/or a virtual reality environment. An augmented reality environment may include views of the images of virtual content superimposed over the views of the real-world. A virtual reality environment may include views of virtual content within a virtual environment.

The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form or perceive coherent virtual content. Virtual content may include one or more virtual objects, and/or other content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

The system 100 presented herein may include techniques in which images of virtual content forming part of an augmented reality environment may be presented over an angular portion of a user's field-of-view corresponding to a central field-of-view, and other images of virtual content forming another part of the augmented reality environment may be presented over an angular portion of a user's field-of-view corresponding to a peripheral field-of-view, thereby expanding the field-of-view at which content may be viewable by the user. The central field-of-view may refer to an angular range of a user's field-of-view when the user is looking forward. The central field-of-view may include one or more of central vision, paracentral vision, near-peripheral vision, and/or other areas and/or ranges within a user's field-of-view. The peripheral field-of-view may refer to an angular range of a user's field-of-view when the user is looking forward. The peripheral field-of-view may include one or more of near-peripheral vision, mid-peripheral vision, far peripheral vision, and/or other areas and/or ranges within a user's field-of-view. It is noted that "field-of-view" may refer generally to a horizontal field-of-view in one or both of monocular or binocular vision. It is further noted that the term "horizontal" may refer to a reference line or plane that may be orthogonal to a user's head position, and not necessarily orthogonal to the local gravity vector.

Human vision within the peripheral field-of-view is significantly worse than in the central field-of-view in many ways. Poorer spatial resolution in the periphery is largely due to a decreased cone photoreceptor density. Accordingly, human vision may not appreciate detail within the peripheral field-of-view. To exploit this, in some implementations the images forming virtual content presented at the angular portion corresponding to central field-of-view may be generated at a higher resolution than the images forming virtual content presented at the angular portion corresponding to peripheral field-of-view. In some implementations, a user may shift their gaze such the user may not be looking straight forward (e.g., look to the left or right). The user's gaze may then be directed at portions of the field-of-view that would otherwise be within their peripheral field-of-view if the user was still looking straight forward. In such implementations, the second resolution may be the same or similar as the first resolution.

The system 100 may include one or more of a headset 102, one or more physical processors 104, one or more image forming components 114, gaze tracking device 115, and/or other components. In some implementations, one or more components of system 100 may be included with and/or otherwise held by headset 102. The headset 102 may be configured to be installed (e.g., worn) on a head of a user. By way of non-limiting illustration, headset 102 may include one or more of a head-mounted display (HMD) (see, e.g., FIG. 12), glasses, and/or other devices.

Individual image forming components of one or more image forming components 114 may be configured to generate light rays to form sets of images of virtual content at one or more resolutions. Virtual content may be perceived within a three-dimensional light field within a viewing user's field-of-view. Virtual content may be perceived at individual focal planes within the three-dimensional light field. An individual focal plane may correspond to a perceived range at which virtual content may appear to the user as being positioned in the real-world.

Figure 2:
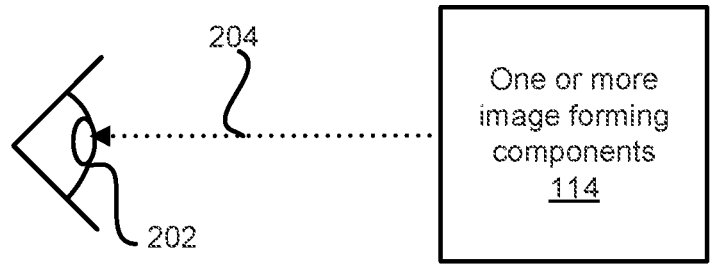
FIG. 2 illustrates an exemplary configuration of one or more image forming components with respect to a user's eye, in accordance with one or more implementations.

In FIG. 2, one or more image forming components 114 may be configured such that one or more sets of images of virtual content may be presented to the user. The presentation of images may be facilitated by directing light rays 204 into at least one eye 202 of the user. The one or more image forming components 114 may be configured such that the one or more sets of images of virtual content may be superimposed over a view of the real world to create an augmented reality environment. In some implementations, images may be presented individually to each eye of the user as stereo image pairs.

Figure 3:
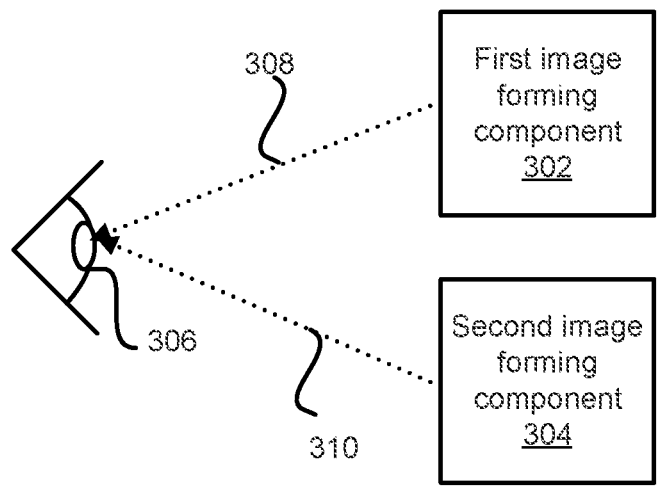
FIG. 3 illustrates an exemplary configuration of two image forming components with respect to a user's eye, in accordance with one or more implementations.

In FIG. 3, one or more image forming components may include a first image forming component 302, a second image forming component 304, and/or other components. The first image forming component 302 may be held by a headset (not shown in FIG. 3). The first image forming component 302 may be configured to generate light rays 308 to form a first set of images of virtual content at a first resolution. The first image forming component 302 may be configured such that when the headset is installed (e.g., worn) on the head of the user, the first set of images of virtual content may be presented to the user by first image forming component 302 over a first angular portion of the user's field-of-view (e.g., monocular field-of-view from eye 306). The first image forming component 302 may be configured such that the first set of images of virtual content may be superimposed over a view of the real world to create at least part of an augmented reality environment.

The second image forming component 304 may be held by the headset. The second image forming component 304 may be configured to generate light rays 310 to form a second set of images of virtual content at a second resolution. In some implementations, the second resolution may be different from the first resolution. In some implementations, the second resolution may be the same or similar to the first resolution. The second image forming component 304 may be configured such that when the headset is installed on the head of the user, the second set of images of virtual content may be presented to the user by second image forming component 304 over a second angular portion of the user's field-of-view (e.g., monocular field-of-view from eye 306). The second angular portion may be different from the first angular portion. The second image forming component 304 may be configured such that the second set of images of virtual content may be superimposed over the view of the real world to create at least a second part of the augmented reality environment. Other sets of images may be presented over angular portions of another eye of the user that may comprise stereo image counterparts of the first set of images and second set of images to create a stereoscopic effect when viewed by both eyes of the user.

In some implementations, the first angular portion may not overlap with the second angular portion. The first angular portion may correspond to a central field-of-view within the user's monocular field-of-view from a given eye. The second angular portion may correspond to a peripheral field-of-view within the user's monocular field-of-view from the given eye. By way of non-limiting illustration, the first angular portion may correspond to one or more of a 50 degree range, a 60 degree range, a 70 degree range, and/or other ranges in the user's field-of-view. The first angular portion may be centered along the user's line of sight from the given eye (e.g., when the user is looking straight ahead). By way of non-limiting illustration, the second angular portion may correspond to one or more of a 20 degree range, a 30 degree range, a 40 degree range, and/or other ranges in the user's field-of-view. The second angular portion may be adjacent to the first angular portion. In some implementations, the second angular portion may be positioned at the temporal side of the user's visual field (e.g., as opposed to the nasal side). In some implementations, adjacent may mean that the first angular portion and second angular portion may be positioned laterally with respect to each other within the user's field-of-view. In some implementations, the first angular portion and second angular portion may be positioned laterally within the user's field-of-view insofar that a terminating edge of the first angular portion may abut a terminating edge of the second angular portion. The first angular portion may be contiguous with the second angular portion.

In some implementations, the first angular portion may overlap with the second angular portion. The overlap may be slight and/or imperceptible by the user. The first angular portion may overlap the second angular portion by a 1-3 degree range over the user's field-of-view. The first angular portion may overlap the second angular portion by less than 10% of the viewing range associated with the first angular portion. The first angular portion may overlap the second angular portion by less than 5% of the viewing range associated with the first angular portion. The first angular portion may overlap the second angular portion by less than 1% of the viewing range associated with the first angular portion.

In some implementations, the first resolution of the first set of images presented over the first angular portion may be higher than the second resolution of the second set of images presented over the second angular portion. In some implementations, high resolution may mean the image resolution may be higher than 30 pixels per degree, for example, 60 pixels per degree and/or other resolutions. In some implementations, low resolution may mean the image resolution may be lower than 30 pixels per degree, for example, 20 pixels per degree and/or other resolution.

Returning to FIG. 1, in some implementations, individual ones of the image forming components of one or more image forming components 114 may include one or more of one or more light sources, one or more optical elements, one or more optical lenses, one or more deformable mirrors, one or more fiber bundles, one or more scanning fiber systems, and/or other components.

Figure 4:
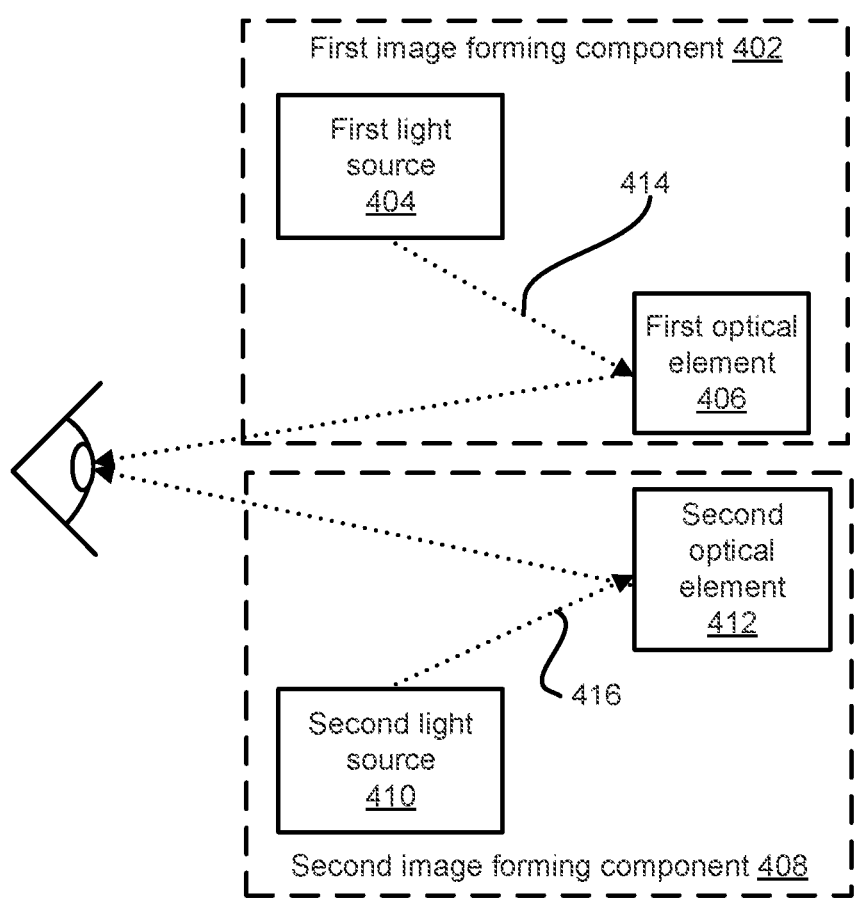
FIG. 4 illustrates an exemplary configuration of two image forming components with respect to a user's eye, in accordance with one or more implementations.

By way of non-limiting illustration in FIG. 4, a first image forming component 402 may include one or more of a first light source 404, a first optical element 406, and/or other components. A second image forming component 408 may include one or more of a second light source 410, a second optical element 412, and/or other components. The first optical element 406 and second optical element 412 may be part of a unitary structure (e.g., a visor of an HMD).

Figure 5:
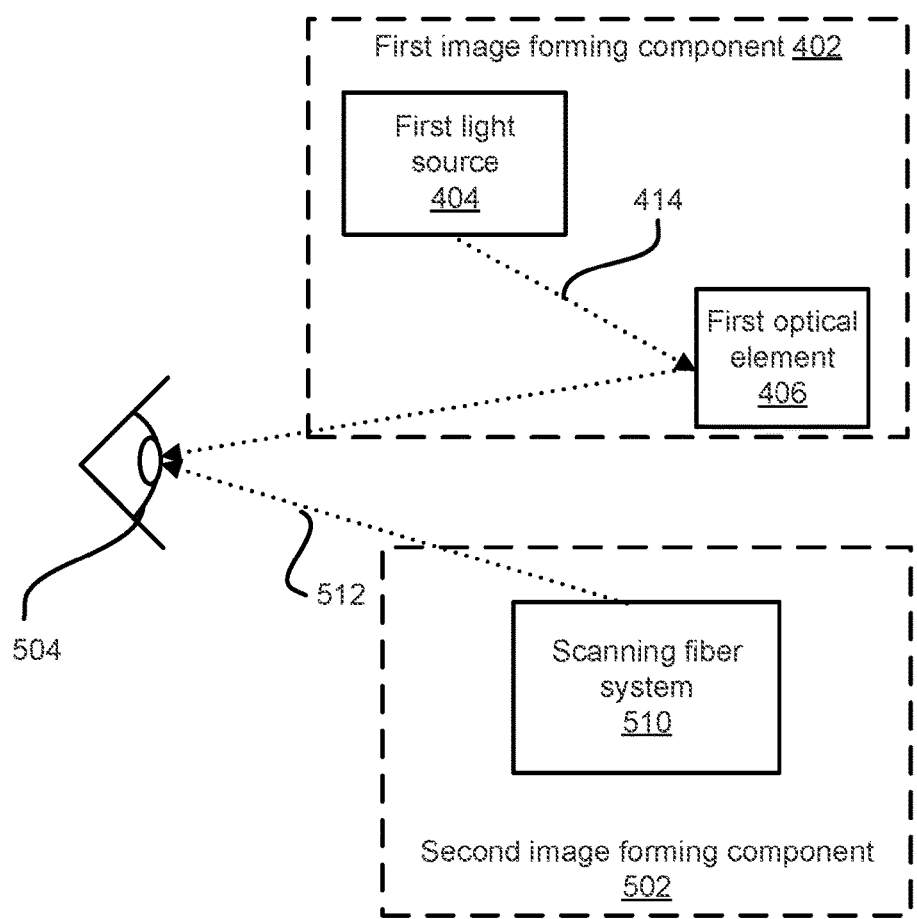
FIG. 5 illustrates an exemplary configuration of two image forming components with respect to a user's eye, in accordance with one or more implementations.

By way of non-limiting illustration in FIG. 5, first image forming component 402 may include one or more of first light source 404, first optical element 406, and/or other components. A second image forming component 502 may include a scanning fiber system 510, and/or other components.

Figure 10:
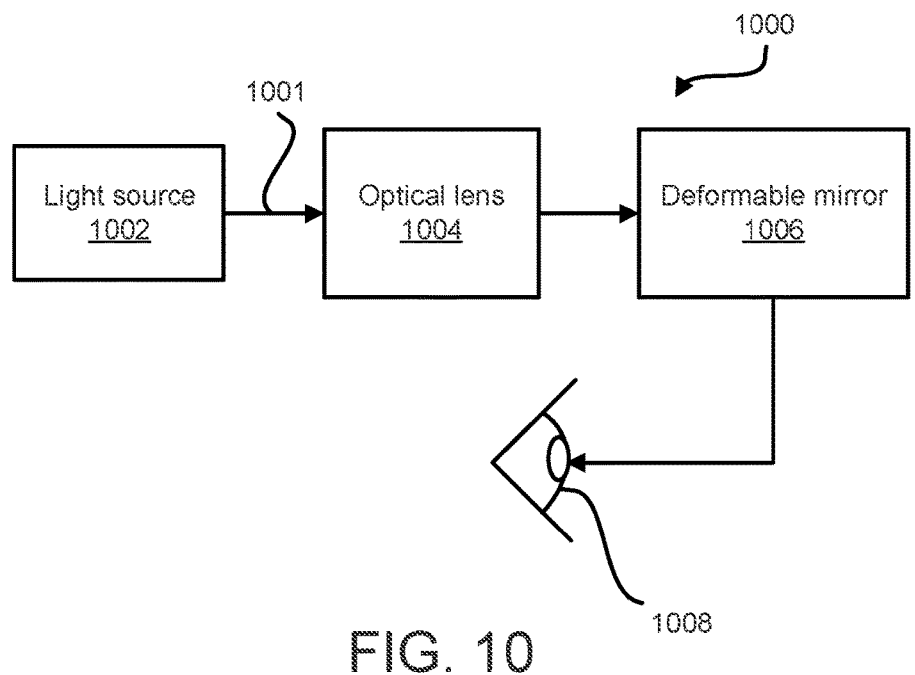
FIG. 10 illustrates an exemplary configuration of an image forming component, in accordance with one or more implementations.

By way of non-limiting illustration in FIG. 10, an image forming component 1000 may include one or more of a light source 1002, an optical lens 1004, a deformable mirror 1006, and/or other components.

Figure 11:
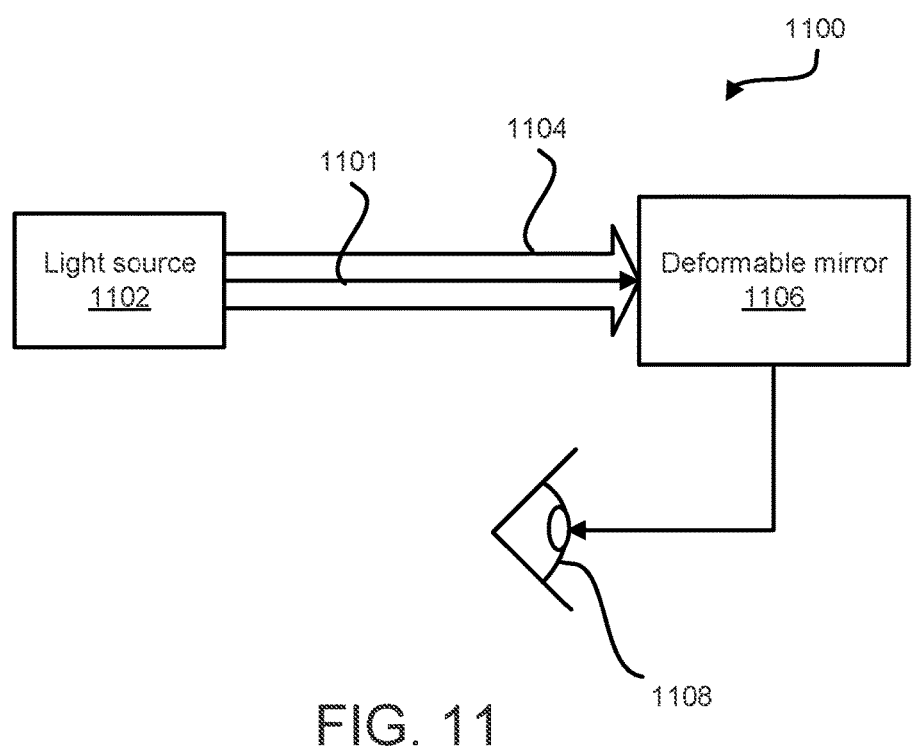
FIG. 11 illustrates an exemplary configuration of an image forming component, in accordance with one or more implementations.

By way of non-limiting illustration in FIG. 11, an image forming component 1100 may include one or more of a light source 1102, an image fiber bundle 1104, a deformable mirror 1106, and/or other components.

Figure 12:
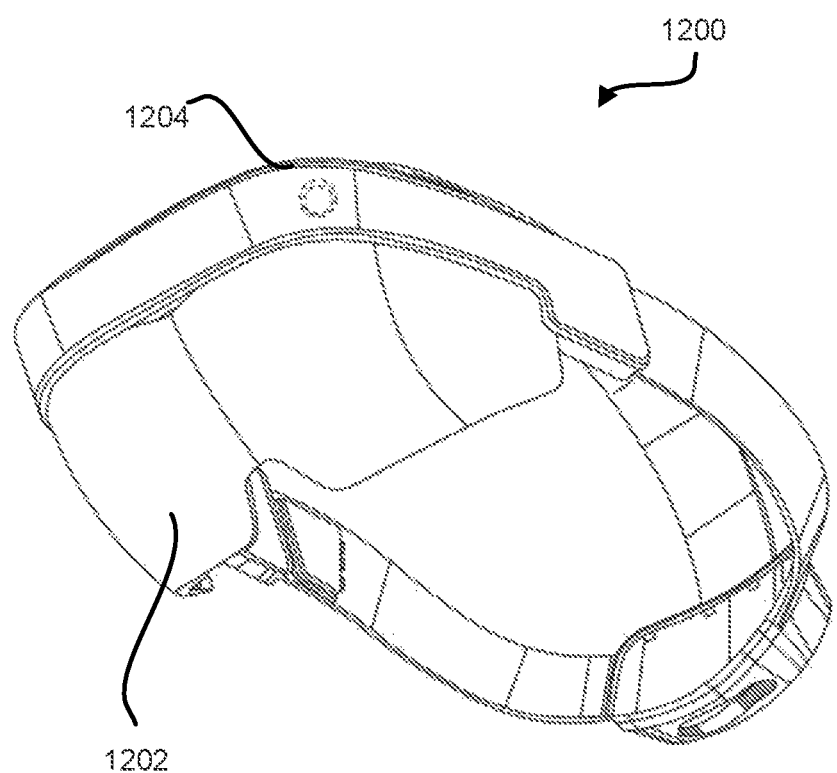
FIG. 12 illustrates a headset, in accordance with one or more implementations.

Referring now to FIG. 12, in some implementations, headset 102 (e.g., FIG. 1) may comprise an HMD 1200. One or more components of system 100 (FIG. 1) may be held by and/or comprise part of HMD 1200. By way of non-limiting illustration, one or more optical elements may comprise at least part of a visor portion 1202 of an HMD 1200. One or more of one or more physical processors 104 (FIG. 1), one or more light sources (not shown in FIG. 12), one or more optical lenses (not shown in FIG. 12), one or more deformable mirrors (not shown in FIG. 12), one or more fiber bundles (not shown in FIG. 12), one or more scanning fiber systems (not shown in FIG. 12), and/or other components of system 100 (FIG. 1) may be incorporated into a housing portion 1204 and/or other portions of HMD 1200.

An individual light source of an individual image forming component may be configured to generate light rays to form images of virtual content. It is noted that the use of the term "light ray" is not intended to limit the scope of the disclosure to single, discrete, photons and/or packets of photons. Instead, the disclosure may envision a light ray to mean a light beam comprising multiple and continuous photons, in one or more implementations. A light source may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources.

In some implementations, an individual light source of an individual image forming component may be arranged on a headset to direct light rays toward one or more optical elements and/or other components of the individual image forming component. Light rays may be reflected off the one or more optical elements and/or other components and into one or more eyes. For example, returning to FIG. 4, first light source 404 may be arranged on a headset (not shown in FIG. 4) to direct light rays 414 toward first optical element 406. The second light source 410 may be arranged on the headset to direct light rays 416 toward second optical element 406. Returning to FIG. 10, optical lens 1004 may be positioned between light source 1002 and deformable mirror 1006. The light source 1002 may be configured to generate light rays 1001. The light rays 1001 generated by light source 1002 may pass through optical lens 1004 and may be directed onto deformable mirror 1006. Optical lens 1004 may have a fixed focal length. Light rays 1001 may be reflected off deformable mirror 1006 and into user's eye 1008. Returning to FIG. 11, light source 1102 may be configured to generate light rays 1101. The light rays 1101 generated by light source 1102 may be directed toward deformable mirror 1106 via image fiber bundle 1104. Light rays 1101 may be reflected off deformable mirror 1106 and into user's eye 1108. It is noted that in some implementations, light rays 1101 may be guided directly into a waveguide and/or other optical element via image fiber bundle 1104 without the use of deformable mirror 1106.

In some implementations, an optical element may form at least part of a portion of headset 102 through which a user may view the real-world. An optical element may comprise one or more reflective and/or partially reflective surfaces. An optical element may be formed from a reflective and/or partially reflective material. A reflective and/or partially reflective material may comprise one or more ZEONEX, Cyclo Olefin Polymer (COP), Cyclic Olefin Copolymer (COC), polycarbonate, Poly (methyl methacrylate) (PMMA), and/or other materials.

In some implementations, an optical element may comprise a beam splitter and/or other components. A beam splitter may comprise one or more of a polarizing beam splitter, a thin-film deposited dielectric partial mirror (for example, 60% reflection and 40% transmittance), and/or other beam splitter.

In some implementations, an optical element may comprise a waveguide and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user. In some implementations, a waveguide may include one or more waveguides and/or other components as described in U.S. Provisional Patent Application No. 62/409,505, titled "IMAGE PROJECTION SYSTEMS AND METHODS," which is incorporated in its entirety herein by reference.

In some implementations, an optical element may comprise a planar partial mirror array waveguide and/or other components. The light rays from a light source may be coupled into the waveguide at an entrance of the waveguide, and propagated to a partial mirror array region of the waveguide by total internal reflection. Then the light rays may be reflected by the partial mirror array and directed toward the user's eye.

In some implementations, an optical element may comprise a free form surface prism. The light rays from a light source may be coupled into the prism, reflected by the two free form surfaces of the prism, and then directed toward the user's eye.

In some implementations, one or more optical elements may be arranged on a headset such that, when the headset is installed on the head of a user, the user's gaze may be directed toward the one or more optical elements. In some implementations, one or more optical elements may be arranged on a headset such that, when the headset is installed on the head of the user, light rays generated by one or more light sources may be directed onto the one or more optical elements to form images of virtual content on the one or more optical elements. The images of virtual content on the one or more optical elements may be superimposed over the user's view of the real world through the one or more optical elements to create an augmented reality environment.

In some implementations, one or more optical elements may be arranged on a headset such that light rays generated by one or more light sources may be directed at the one or more optical elements, coupled into the one or more optical elements, and directed out of the one or more optical element into an eye of a user. The images of virtual content may be projected onto a retina of the eye such that the images may be superimposed over the user's view of the real world.

In some implementations, an individual image forming component may be configured to present images of virtual content to a user through retinal scanning and/or retinal projection. By way of non-limiting illustration in FIG. 5, scanning fiber system 510 of second image forming component 502 may be configured to direct light rays 512 directly into the retina of a user's eye 504.

A scanning fiber system may be configured to perform retinal scanning to project images of virtual content directly onto individual retinas of individual eyes of a user. A scanning fiber system may include one or more of a piezo actuation tube, a single-mode fiber, one or more RGB modulation lasers, and/or other components.

A deformable mirror may be configured to reflect light rays emitted by one or more light sources into one or more eyes of a user. A deformable mirror may be segmented or continuous. Segmented mirrors may have many smaller mirror sections that may be controlled individually. The larger the number of segments, the more precision of the control of the mirror shape may be achieved. Change in the mirror shape may result in the change of the focal length of the deformable mirror.

In some implementations, a deformable mirror may be adjustable to change a focal length of the deformable mirror. In some implementations, increasing the focal length of a deformable mirror (e.g., decreasing its optical power) may cause the range of a focal plane within a perceived three-dimensional light field to decrease. Virtual content perceived at that focal plane may appear closer to the user. Increasing a focal length of a deformable mirror may mean more work needs by done by an eye's crystalline lens to focus the point on the retina. This flexing of the ciliary muscles may cause the human visual system to perceive virtual content as being closer.

In some implementations, decreasing the focal length of a deformable mirror (e.g., increasing the optical power) may cause the range of a focal plane within a perceived three-dimensional light field to increase. Virtual content placed at that focal plane may appear farther from the user. Decreasing the focal length may mean less work may be done by the eye's crystalline lens to focus the point on the retina. The relaxation of the ciliary muscles may cause the human visual system to perceive virtual content as being farther away.

It is noted that one skilled in the art may recognize that the features and/or functions of deformable mirror may achieved using a variable power lens. Such a variable power lens may replace the deformable mirror and/or may be used in conjunction with the deformable mirror. For example, a variable power lens may comprise a liquid lens and/or other variable power lenses. An individual variable power lens may be adjustable to change a focal length of the variable power lens and/or other attributes of the variable power lens. In some implementations, increasing the focal length of a variable power lens (e.g., decreasing it's optical power) may cause a range of a focal plane within a perceived three-dimensional light field to decrease. Virtual content perceived at that focal plane may appear closer to the user. Increasing a focal length of a lens may mean more work needs by done by an eye's crystalline lens to focus the point on the retina. This flexing of the ciliary muscles may cause the human visual system to perceive virtual content as being closer. In some implementations, decreasing the focal length of a variable power lens (e.g., increasing the optical power) may cause a range of a focal plane within a perceived three-dimensional light field to increase. Virtual content placed at that focal plane may appear farther from the user. Decreasing the focal length may mean less work may be done by the eye's crystalline lens to focus the point on the retina. The relaxation of the ciliary muscles may cause the human visual system to perceive virtual content as being farther away.

An image fiber bundle may be configured to relay light rays emitted by one or more light sources. The diameter of single fiber in the image fiber bundle may be less than 10 micrometers, for example, 6 micrometers. The smaller single diameter, the higher resolution image may be relayed by the fiber bundle.

Returning to FIG. 1, gaze tracking device 115 may include one or more of a sensor, an emitter, and/or other components. The emitter may be configured to emit light. The emitter may comprise an infrared (IR) emitter configured to emit IR light. In some implementations, a sensor may comprise one or more of an IR sensor, an image sensor, and/or other sensors. A sensor may be incorporated into a camera and/or other devices. By way of non-limiting illustration, a sensor of gaze tracking device 115 may comprise an IR camera and/or other devices. In some implementations, output signals of one or more sensors of gaze tracking device 115 may convey one or more of positions of one or more pupils of a user relative to a locus of a reflectance of light emitted by an emitter of gaze tracking device 115, and/or other information. Output signals of one or more sensors of gaze tracking device 115 may be used to determine a user's gaze direction. By way of non-limiting illustration, gaze direction may indicate whether the user is looking straight ahead into the central field-of-view, and/or if the user is looking to the left and/or right into the peripheral field-of-view.

Figure 6:
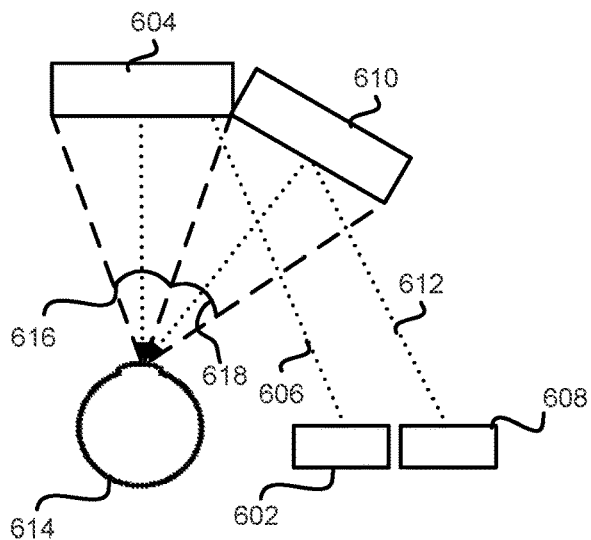
FIG. 6 illustrates an exemplary configuration of two image forming components with respect to a user's eye, in accordance with one or more implementations.

FIG. 6 illustrates an exemplary configuration of two image forming components with respect to a user's eye 614. For illustrative purposes, the components are viewed from a top-down perspective, and eye 614 is a user's right eye. It is also noted that the components shown may be similarly used for the left eye of the user, with the components in a mirrored and/or other configuration. A first image forming component may comprise one or more of a first light source 602, a first optical element 604, and/or other components. The first light source 602 may be configured to generate light rays 606 to form a first set of images of virtual content at a first resolution. The first optical element 604 may be arranged on the headset to present the first set of images over a first angular portion 616 of the user's field-of-view. The first angular portion 616 may comprise a 50 degree (or other range) portion of the user's monocular field-of-view from eye 614. The first angular portion 616 may be centered around the user's line of sight from eye 614. The first optical element 604 may be arranged on the headset such that light rays 606 generated by first light source 602 may be coupled into first optical element 604, propagated through first optical element 604, and directed out of first optical element 604 to form the first set of images of virtual content in eye 614. The first set of images of virtual content may be superimposed over the users view of the real world.

In some implementations, first light source 602 may comprise one or more of a microelectromechanical systems (MEMS) RGB laser scanner, a microLED microdisplay, an LED or RGB lasers illuminated liquid crystal on silicon (LCOS), a digital light projector (DLP), a digital micromirror device (DMD), a liquid crystal display (LCD), an organic light-emitting diode (OLED) display, an OLED microdisplay, and/or other light sources. The first optical element 604 may include a waveguide and/or other optical elements.

A second image forming component may comprise one or more of a second light source 608, a second optical element 610, and/or other components. The second light source 608 may be configured to generate light rays 612 to form a second set of images of virtual content at a second resolution. The second optical element 610 may be arranged on the headset such that when the headset is installed on the head of the user, the user's vision over a second angular portion 618 of the user's field-of-view may be directed toward second optical element 610. The second angular portion 618 may comprise a 20 degree (or other range) portion of the user's monocular field-of-view from eye 614 adjacent to the first angular portion 616. The second angular portion 618 may be on the temporal side of the user's field-of-view from eye 614. The second optical element 610 may be arranged on the headset such that light rays 612 generated by second light source 608 may be directed onto second optical element 610 to form the second set of images of virtual content on second optical element 610. The second set of images of virtual content may be superimposed over the view of the real world through second optical element 610.

The second light source 608 may comprise one or more of a microelectromechanical systems (MEMS) RGB laser scanner, a microLED microdisplay, an LED or RGB lasers illuminated liquid crystal on silicon (LCOS), a digital light projector (DLP), a digital micromirror device (DMD), a liquid crystal display (LCD), an organic light-emitting diode (OLED) display, an OLED microdisplay, and/or other light sources.

In some implementations, second optical element 610 may include a semi-reflective visor (or visor portion), and/or other optical elements.

In some implementations, second optical element 610 may be configured to present the second set of images over second angular portion 618 of the user's field-of-view. The second optical element 610 may be arranged on the headset such that light rays 612 generated by second light source 608 may be coupled into second optical element 610, propagated through second optical element 610, and directed out of second optical element 610 to form the second set of images of virtual content in eye 614.

In some implementations, second optical element 610 may include a waveguide, and/or other optical elements.

In some implementations, second optical element 610 may include a polarizing beam splitter and/or other optical elements.

In some implementations, second optical element 610 may include a free form prism and/or other optical elements.

Figure 7:
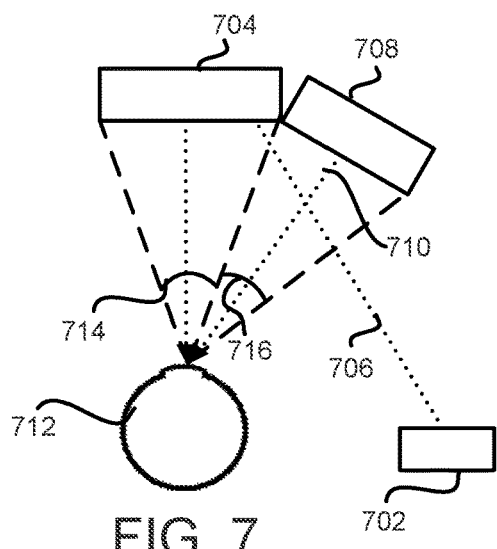
FIG. 7 illustrates an exemplary configuration of two image forming components with respect to a user's eye, in accordance with one or more implementations.

FIG. 7 illustrates another exemplary configuration of two image forming components with respect to a user's eye 712. For illustrative purposes, the components are viewed from a top-down perspective, and eye 712 is a user's right eye. It is also noted that the components shown may be similarly used for the left eye of the user, with the components in a mirrored and/or other configuration. A first image forming component may comprise one or more of a first light source 702, a first optical element 704, and/or other components. The first light source 702 may be configured to generate light rays 706 to form a first set of images of virtual content at a first resolution. The first optical element 704 may be arranged on a headset (not shown in FIG. 7) to present the first set of images over a first angular portion 714 of the user's field-of-view. The first optical element 704 may be arranged on the headset such that light rays 706 generated by first light source 702 may be coupled into first optical element 704, propagated through first optical element 704, and directed out of first optical element 704 to form the first set of images of virtual content in eye 712. The first set of images of virtual content may be superimposed over a view of the real world.

In some implementations, first light source 702 may comprise one or more of a microelectromechanical systems (MEMS) RGB laser scanner, a microLED microdisplay, an LED or RGB lasers illuminated liquid crystal on silicon (LCOS), a digital light projector (DLP), a digital micromirror device (DMD), a liquid crystal display (LCD), an organic light-emitting diode (OLED) display, an OLED microdisplay, and/or other light sources. The first optical element 704 may include a waveguide, and/or other optical elements.

A second image forming component may comprise a scanning fiber system 708, and/or other components. The scanning fiber system 708 may be configured to generate light rays 710 to form a second set of images of virtual content at a second resolution. The scanning fiber system 708 may be configured such that when the headset is installed on the head of the user, the second set of images of virtual content may be presented to the user over a second angular portion 716 of the user's field-of-view. The light rays 710 may be directed directly into the retina of eye 712 such that the second set of images may be superimposed over the user's view of the real-world through eye 712.

Figure 8:
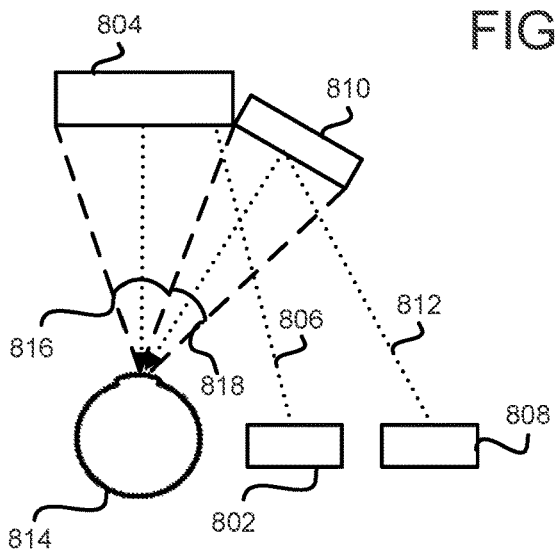
FIG. 8 illustrates an exemplary configuration of two image forming components with respect to a user's eye, in accordance with one or more implementations.

FIG. 8 illustrates an exemplary configuration of two image forming components with respect to a user's eye 814. For illustrative purposes, the components are viewed from a top-down perspective, and eye 814 is a user's right eye. It is also noted that the components shown may be similarly used for the left eye of the user, with the components in a mirrored and/or other configuration. A first image forming component may comprise one or more of a first light source 802, a first optical element 804, and/or other components. The first light source 802 may be configured to generate light rays 806 to form a first set of images of virtual content at a first resolution. The first optical element 804 may be arranged on a headset (not shown in FIG. 8) to present the first set of images over a first angular portion 816 of the user's field-of-view. The first optical element 804 may be arranged on the headset such that light rays 806 generated by first light source 802 may be coupled into first optical element 804, propagated through first optical element 804, and directed out of first optical element 804 to form the first set of images of virtual content in eye 814. The first set of images of virtual content may be superimposed over a view of the real world.

In some implementations, first light source 802 may comprise one or more of a microelectromechanical systems (MEMS) RGB laser scanner, a microLED microdisplay, an LED or RGB lasers illuminated liquid crystal on silicon (LCOS), a digital light projector (DLP), a digital micromirror device (DMD), a liquid crystal display (LCD), an organic light-emitting diode (OLED) display, an OLED microdisplay, and/or other light sources. The first optical element 804 may include a waveguide and/or other optical elements.

A second image forming component may comprise one or more of a second light source 808, a deformable mirror 810, and/or other components. Other components may include one or more of an optical lens (see, e.g., FIG. 10), an image fiber bundle (see, e.g., FIG. 11), and/or other components. The second light source 808 may be configured to generate light rays 812 to form a second set of images of virtual content at a second resolution. The second optical element 612 may be arranged on the headset such that light rays 812 generated by second light source 808 may be directed onto deformable mirror 810 and reflected off deformable mirror to form the second set of images of virtual content in the retina of eye 814. The light rays 812 reflected off deformable mirror 810 and into the retina of eye 814 may form images on retina covering a second angular portion 818 of the users monocular field-of-view from eye 814.

Figure 9:
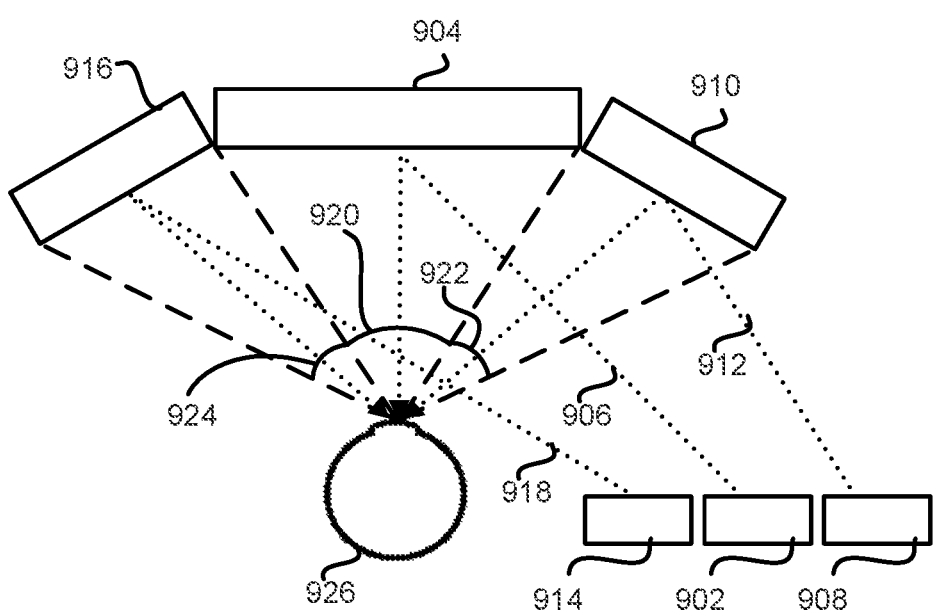
FIG. 9 illustrates an exemplary configuration of three image forming components with respect to a user's eye, in accordance with one or more implementations.

FIG. 9 illustrates an exemplary configuration of three image forming components with respect to a user's eye 926. For illustrative purposes, the components are viewed from a top-down perspective, and eye 926 is a user's right eye. It is also noted that the components shown may be similarly used for the left eye of the user, with the components in a mirrored and/or other configuration. A first image forming component may comprise one or more of a first light source 902, a first optical element 904, and/or other components. The first light source 902 may be configured to generate light rays 906 to form a first set of images of virtual content at a first resolution. The first optical element 904 may be arranged on a headset (not shown in FIG. 9) such that when the headset is installed (e.g., worn) on the head of the user, the user's vision over a first angular portion 920 of the user's field-of-view may be directed toward first optical element 904. The first angular portion 916 may comprise a 50 degree (or other range) portion of the users monocular field-of-view from eye 926. The first angular portion 920 may be centered around the users line of sight from eye 926. The first optical element 904 may be arranged on the headset such that light rays 906 generated by first light source 902 may be directed onto first optical element 904 to form the first set of images of virtual content on first optical element 904. The first set of images of virtual content may be superimposed over a view of the real world through first optical element 904. It is noted that in those skilled in the art may recognize that the first image forming component may be of another configuration described herein and is not limited by the above description.

A second image forming component may comprise one or more of a second light source 908, a second optical element 910, and/or other components. The second light source 908 may be configured to generate light rays 912 to form a second set of images of virtual content at a second resolution. The second optical element 912 may be arranged on the headset such that when the headset is installed on the head of the user, the user's vision over a second angular portion 922 of the user's field-of-view may be directed toward second optical element 910. The second angular portion 922 may comprise a 20 degree (or other range) portion of the user's monocular field-of-view from eye 926 extending from the first angular portion 920. The second angular portion 922 may be on the temporal side of the user's field-of-view from eye 926. The second optical element 910 may be arranged on the headset such that light rays 912 generated by second light source 908 may be directed onto second optical element 910 to form the second set of images of virtual content on second optical element 910. The second set of images of virtual content may be superimposed over the view of the real world through second optical element 910. It is noted that in those skilled in the art may recognize that the second image forming component may be other another type described herein and is not limited by the above description.

A third image forming component may comprise one or more of a third light source 914, a third optical element 916, and/or other components. The third light source 914 may be configured to generate light rays 918 to form a third set of images of virtual content at the second resolution. The third optical element 916 may be arranged on the headset such that when the headset is installed on the head of the user, the user's vision over a third angular portion 924 of the user's field-of-view may be directed toward third optical element 916. The third angular portion 924 may comprise a 20 degree (or other range) portion of the user's monocular field-of-view from eye 926 adjacent to first angular portion 920. The third angular portion 924 may be on the nasal side of the user's field-of-view from eye 926. The third optical element 916 may be arranged on the headset such that light rays 918 generated by third light source 914 may be directed onto third optical element 916 to form the third set of images of virtual content on third optical element 916. The third set of images of virtual content may be superimposed over the view of the real world through third optical element 916. It is noted that in those skilled in the art may recognize that the third image forming component may be other another type described herein and is not limited by the above description.

Returning to FIG. 1, in some implementations, one or more physical processors 104 may be configured by machine-readable instructions 106. Executing machine-readable instructions 106 may cause one or more physical processors 104 to facilitate providing an interactive environment, such as an augmented reality environment and/or a virtual reality environment, over an expanded field-of-view. The machine-readable instructions 106 may include one or more of a content component 108, a control component 110, an eye tracking component 111, and/or other components.

In some implementations, content component 108 may be configured to determine virtual content to present to a user. Virtual content may include one or more virtual objects and/or other virtual content. Virtual content may be in the form of digital imagery generated by one or more image forming components 114.

In some implementations, control component 110 may be configured to control individual ones of one or more image forming components 114. By way of non-limiting illustration, controlling one or more image forming components 114 may include controlling one or more of one or more light sources, one or more optical elements, one or more deformable mirrors, and/or other components.

One or more light sources may be controlled to generate light rays in accordance with virtual content to be presented to the user. One or more light sources may be controlled to generate light rays in accordance with intended resolutions of the images of virtual content to be presented to the user. The virtual content may be perceived by the viewing user to lie within three-dimensional real space at a range that may be equal to a range of a focal plane within the viewing user's field-of-view, and/or other ranges. By way of non-limiting illustration, a light source may generate light rays to form a digital image, which when directed into a user's eyes, may be perceived as virtual content in three-dimensional space within the user's field-of-view of the real-world.

A deformable mirror may be controlled adjust a focal length of the deformable mirror. In some implementations, control of a deformable mirror may impact a perceived range of virtual content within a three-dimensional light field.

In some implementations, eye tracking component 111 may be configured to determine a user's gaze direction and/or other information. Gaze direction may be determined over time. In some implementations, gaze direction may be determined with respect to a user's pupil and/or other reference point. In some implementation, gaze direction may be determined from output signals from one or more sensors of gaze tracking device 115, and/or other information. The output signals may convey one or more of positions of one or more pupils of a user relative to a locus of a reflectance of light emitted by an emitter of gaze tracking device 115, and/or other information used to determine gaze direction. In some implementations, gaze direction may be expressed as a vector within a three-dimensional coordinate system.

In some implementations, control component 110 may be configured to adjust control individual ones of one or more image forming components 114 based on information derived from eye tracking component 111. For example, based on gaze tracking component 111 determining that a user may be directing their gaze toward the central field-of-view, control component 110 may be configured to control an image forming component that presents images to the user over the central field-of-view to be at a relatively high resolution, and to control an image forming component that presents images to the user over the peripheral field-of-view to be at a relatively low resolution. For example, based on gaze tracking component 111 determining that a user may be directing their gaze toward the peripheral field-of-view, control component 110 may be configured to control an image forming component that presents images to the user over the central field-of-view to be at a relatively high resolution, and to control an image forming component that presents images to the user over the peripheral field-of-view to be at the same resolution.

In some implementations, one or more of processor(s) 104, one or more image forming components 114, gaze tracking device 115, external resources 116, and/or other components may be operatively linked via one or more electronic communication links. For example, such electronic communication links may be established, at least in part, via network(s) 118. Network(s) 118 may comprise one or both of wired or wireless communications. It will be appreciated that this is not intended to be limiting and that the scope of this disclosure includes implementations in which processor(s) 104, one or more image forming components 114, gaze tracking device 115, external resources 116, and/or other components may be operatively linked via some other communication media.

The external resources 116 may include sources of information, hosts, external entities participating with system 100, providers of virtual content, and/or other resources. In some implementations, some or all of the functionality attributed herein to external resources 116 may be provided by resources included in headset 102.

The processor(s) 104 may include and/or have access to electronic storage 112, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 112 may comprise electronic storage media that electronically stores information. The electronic storage media of electronic storage 112 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 112 may include one or more virtual storage resources (e.g., cloud storage, a virtual private network, and/or other virtual storage resources). Electronic storage 112 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 111, and/or other components. Processor(s) 104 may be configured to execute component 108, 110, 111, and/or other components by software; hardware; firmware; some combination of software, hardware, and/or firmware; and/or other mechanisms for configuring processing capabilities on processor(s) 104.

It should be appreciated that although components 108, 110, and 111 are illustrated in FIG. 1 as being co-located within a single processing unit, in implementations in which processor(s) 104 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 104 may be configured to execute one or more additional components that may perform some or all of the functionality attributed to components 108, 110, 111, and/or other components.

Figure 13:
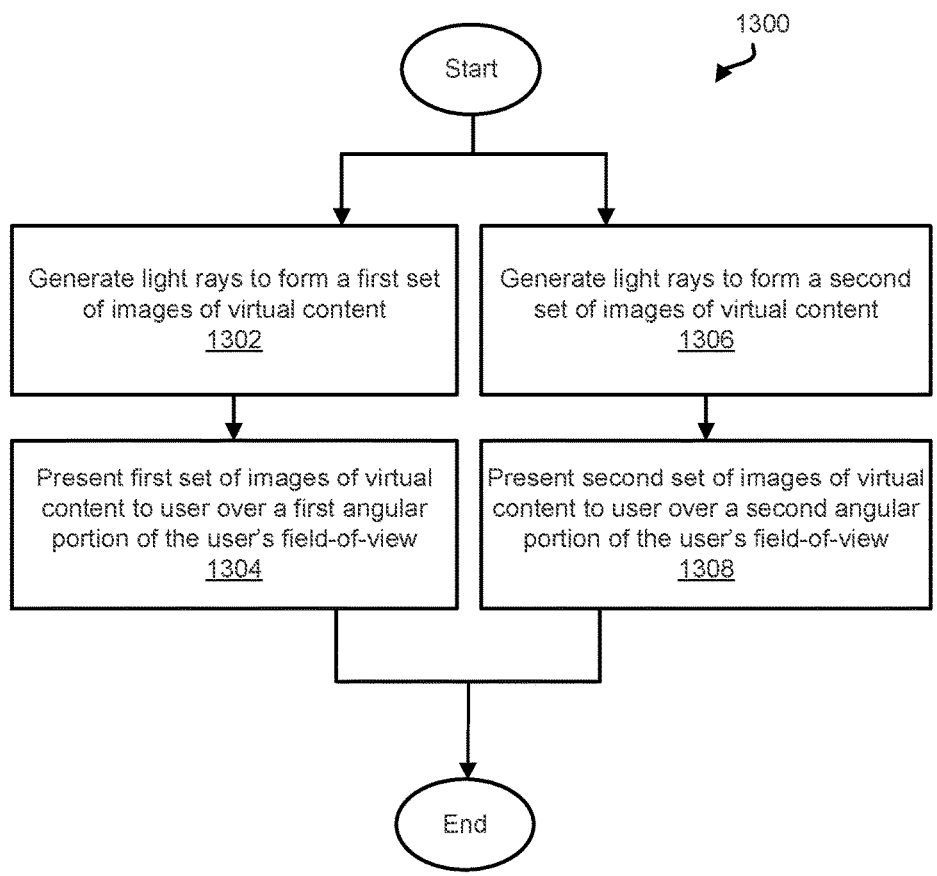
FIG. 13 illustrates a method to provide an interactive environment over an expanded field-of-view, in accordance with one or more implementations.

FIG. 13 illustrates a method 1300 to provide an interactive environment over an expanded field-of-view, in accordance with one or more implementations. The interactive environment may include one or more of a virtual reality environment, an augmented reality environment, and/or other interactive environments. The operations of method 1300 presented below are intended to be illustrative. In some implementations, method 1300 may be accomplished with one or more additional operations not described, and/or without one or more of the operations discussed. Additionally, the order in which the operations of method 1300 are illustrated in FIG. 13 and described below is not intended to be limiting. For example, in some implementations, operations 1302-1304 may be carried out in parallel with operations 1306-1308.

In some implementations, method 1300 may be implemented in and/or using a system configured to provide an interactive environment over an expanded field-of-view, such as system 100 shown in FIG. 1 and described herein. In particular, method 1300 may be implemented in a headset configured to be installed on a head of a user, such as headset 102 shown in FIG. 1 and described herein. The headset may comprise one or more of one or more physical processors, one or more image forming components, and/or other components. The one or more physical processors may include one or more devices executing one or more of the operations of method 1300 in response to instructions stored electronically on electronic storage media. The one or more processing devices may include one or more devices configured through hardware, firmware, and/or software to be specifically designed for execution of one or more of the operations of method 1300.

At an operation 1302, light rays may be generated to form a first set of images of virtual content at a first resolution. In some implementations, operation 1302 may be performed using a first image forming component that is the same or similar to an individual one of one or more image forming components 114 (shown in FIG. 1 and described herein).

At an operation 1304, the first set of images of virtual content may be presented to the user over a first angular portion of the user's field-of-view. The first set of images of virtual content may be superimposed over a view of the real world to create at least part of an augmented reality environment. In some implementations, operation 1304 may be performed using the first image forming component and/or other image forming components.

At an operation 1306, light rays may be generated to form a second set of images of virtual content at a second resolution. The second resolution may be different from the first resolution. In some implementations, operation 1306 may be performed using a second image forming component that is the same or similar to an individual one of one or more image forming components 114 (shown in FIG. 1 and described herein).

At an operation 1308, the second set of images may be presented to the user over a second angular portion of the user's field-of-view. The second angular portion may be different from the first angular portion. The second set of images of virtual content may be superimposed over the view of the real world to create at least part of the augmented reality environment. In some implementations, operation 1308 may be performed using the second image forming component and/or other image forming components.

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide an interactive environment over an expanded field-of-view, the system comprising:
    a headset configured to be installed on a head of a user;
    a first image forming component held by the headset configured to generate light rays to form a first set of images of virtual content at a first resolution, the first image forming component being configured such that (i) when the headset is installed on the head of the user, the first set of images of virtual content is presented to an eye of the user over a first angular portion of the user's monocular field-of-view from the eye, and (ii) the first set of images of virtual content is superimposed over a view of the real world to create at least part of an augmented reality environment;
    a second image forming component held by the headset configured to generate light rays to form a second set of images of virtual content at a second resolution, the second image forming component being configured such that (i) when the headset is installed on the head of the user, the second set of images of virtual content is presented to the eye of the user over a second angular portion of the user's monocular field-of-view from the eye, the second angular portion being different from the first angular portion, and (ii) the second set of images of virtual content is superimposed over the view of the real world to create at least a second part of the augmented reality environment;
    a third image forming component held by the headset configured to generate light rays to form a third set of images of virtual content, the second image forming component being configured such that (i) when the headset is installed on the head of the user, the third set of images of virtual content is presented to a second eye of the user over a third angular portion of the user's monocular field-of-view from the second eye, and (ii) the third set of images of virtual content is superimposed over the view of the real world to create at least a third part of the augmented reality environment;
    a fourth image forming component held by the headset configured to generate light rays to form a fourth set of images of virtual content, the fourth image forming component being configured such that (i) when the headset is installed on the head of the user, the fourth set of images of virtual content is presented to the second eye of the user over a fourth angular portion of the user's monocular field-of-view from the second eye, and (ii) the fourth set of images of virtual content is superimposed over the view of the real world to create at least a fourth part of the augmented reality environment; and
    one or more physical processors configured by machine-readable instructions to:
        control the first image forming component to generate the light rays to form the first set of images of virtual content;
        control the second image forming component to generate the light rays to form the second set of images of virtual content;
        control the third image forming component to generate the light rays to form the third set of images of virtual content; and
        control the fourth image forming component to generate the light rays to form the fourth set of images of virtual content.

2. The system of claim 1, wherein the first image forming component comprises:
    a first light source configured to generate the light rays to form the first set of images of virtual content at the first resolution;
    a first optical element, the first optical element being configured to receive the light rays generated by the first light source that are coupled into the first optical element and guide the light rays to an eye to present the first set of images over the first angular portion of the user's field-of-view, wherein the first set of images of virtual content are superimposed over the view of the real world; and
    wherein the one or more physical processors are further configured by machine-readable instructions such that controlling the first image forming component comprises controlling the first light source to generate the light rays to form the first set of images of virtual content.

3. The system of claim 2, wherein the second image forming component comprises:
    a second light source held by the headset configured to generate the light rays to form the second set of images of virtual content at the second resolution;

a second optical element held by the headset, the second optical element being arranged on the headset such that (i) when the headset is installed on the head of the user, the user's vision over the second angular portion of the user's field-of-view is directed toward the second optical element, and (ii) the light rays generated by the second light source are directed onto the second optical element to form the second set of images of virtual content on the second optical element that reflect into the user's eye, wherein the second set of images of virtual content are superimposed over the view of the real world through the second optical element; and wherein the one or more physical processors are further configured by machine-readable instructions such that controlling the second image forming component comprises controlling the second light source to generate the light rays to form the second set of images of virtual content.

4. The system of claim 3, wherein the first light source and second light source are individually one or more of a microelectromechanical systems (MEMS) RGB laser scanner, a microLED microdisplay, an LED or RGB lasers illuminated liquid crystal on silicon (LCOS) microdisplay, a digital light projector (DLP), a digital micromirror device (DMD), a liquid crystal display (LCD), an organic light-emitting diode (OLED) display, or an OLED microdisplay.

5. The system of claim 3, wherein the first optical element comprises a waveguide, and the second optical element comprises a partially reflective visor portion.

6. The system of claim 3, wherein the first optical element comprises a waveguide, and the second optical element comprises a beam splitter or a free form prism.

7. The system of claim 2, wherein the second image forming component comprises:
   a second light source configured to generate the light rays to form the second set of images of virtual content at the second resolution;
   a second optical element, the second optical element being configured to receive the light rays generated by the second light source that are coupled into the second optical element and guide the light rays to the eye to present the second set of images over the second angular portion of the user's field-of-view, wherein the second set of images of virtual content are superimposed over the view of the real world; and
   wherein the one or more physical processors are further configured by machine-readable instructions such that controlling the second image forming component comprises controlling the second light source to generate the light rays to form the second set of images of virtual content.

8. The system of claim 4, wherein the first optical element includes a first waveguide, and the second optical element includes a second waveguide.

9. The system of claim 2, wherein the second image forming component comprises a scanning fiber system configured to generate the light rays to form the second set of images of virtual content at the second resolution.

10. The system of claim 2, wherein the second image forming component comprises:
    a second light source held by the headset configured to generate the light rays to form the second set of images of virtual content at the second resolution; and
    a deformable mirror.

11. The system of claim 10, further comprising a lens or an image fiber bundle.

12. The system of claim 1, wherein the first resolution is higher than the second resolution.

13. The system of claim 1, wherein the first angular portion does not overlap with the second angular portion of the user's field-of-view.

14. The system of claim 1, wherein the first resolution is the same as the second resolution.

15. A method to provide an interactive environment over an expanded field-of-view, the method being implemented in a headset configured to be installed on a head of a user, the headset comprising a first image forming component, a second image forming component, a third image forming component, and a fourth image forming component, one or more physical processors, and storage media storing machine-readable instructions, the method comprising:
    generating, by the first image forming component, light rays to form a first set of images of virtual content at a first resolution;
    presenting, by the first image forming component, the first set of images of virtual content to an eye of the user over a first angular portion of the user's monocular field-of-view from the eye, the first set of images of virtual content being superimposed over a view of the real world to create at least part of an augmented reality environment;
    generating, by the second image forming component, light rays to form a second set of images of virtual content at a second resolution;
    presenting, by the second image forming component, the second set of images to the eye of the user over a second angular portion of the user's monocular field-of-view from the eye, the second angular portion being different from the first angular portion, the second set of images of virtual content being superimposed over the view of the real world to create at least a second part of the augmented reality environment;
    generating, by the third image forming component, light rays to form a third set of images of virtual content;
    presenting, by the third image forming component, the third set of images to a second eye of the user over a third angular portion of the user's monocular field-of-view from the second eye, the third set of images of virtual content being superimposed over the view of the real world to create at least a third part of the augmented reality environment;
    generating, by the fourth image forming component, light rays to form a fourth set of images of virtual content; and
    presenting, by the fourth image forming component, the fourth set of images to the second eye of the user over a fourth angular portion of the user's monocular field-of-view from the second eye, the fourth set of images of virtual content being superimposed over the view of the real world to create at least a fourth part of the augmented reality environment.

16. The method of claim 15, wherein the first image forming component comprises a first light source configured to generate the light rays to form the first set of images and a first optical element, and wherein the method further comprises:
    coupling the light rays generated by the first light source into the first optical element and guiding the light rays coupled into the first optical element to an eye to form the first set of images of virtual content in the eye, wherein the first set of images of virtual content are superimposed over the view of the real world.

17. The method of claim 16, wherein the second image forming component comprises a second light source configured to generate the light rays to form the second set of images, and a second optical element, and wherein the method further comprises:
  directing the light rays generated by the second light source onto the second optical element to form the second set of images of virtual content on the second optical element and reflect the second set of images into the user's eye, wherein the second set of images of virtual content are superimposed over the view of the real world through the second optical element.

18. The method of claim 17, wherein the first light source and second light source are individually one or more of a microelectromechanical systems (MEMS) RGB laser scanner, a microLED microdisplay, an LED or RGB lasers illuminated liquid crystal on silicon (LCOS) microdisplay, a digital light projector (DLP), a digital micromirror device (DMD), a liquid crystal display (LCD), an organic light-emitting diode (OLED) display, or an OLED microdisplay.

19. The method of claim 17, wherein the first optical element comprises a waveguide, and the second optical element comprises a partially reflective visor portion.

20. The method of claim 17, wherein the first optical element comprises a waveguide, and the second optical element comprises a beam splitter or a free form prism.

21. The method of claim 16, wherein the second image forming component comprises a second light source configured to generate the light rays to form the second set of images and a second optical element, and wherein the method further comprises:
  coupling the light rays generated by the second light source into the second optical element and guiding the light rays coupled into the second optical element to the eye to form the second set of images of virtual content in the eye, wherein the second set of images of virtual content are superimposed over the view of the real world.

22. The method of claim 21, wherein the first optical element includes a first waveguide, and the second optical element includes a second waveguide.

23. The method of claim 16, wherein the second image forming component comprises a scanning fiber system configured to generate the light rays to form the second set of images of virtual content at the second resolution.

24. The method of claim 16, wherein the second image forming component comprises a second light source held by the headset configured to generate the light rays to form the second set of images of virtual content at the second resolution, and a deformable mirror.

25. The method of claim 15, wherein the first resolution is higher than the second resolution.

26. The method of claim 15, wherein the first angular portion does not overlap with the second angular portion of the user's field-of-view.

27. The method of claim 15, wherein the first resolution is the same as the second resolution.

* * * * *